(No Model.)
I. C. & F. T. MICHAEL.
TRACTION WHEEL.
No. 301,743. Patented July 8, 1884.
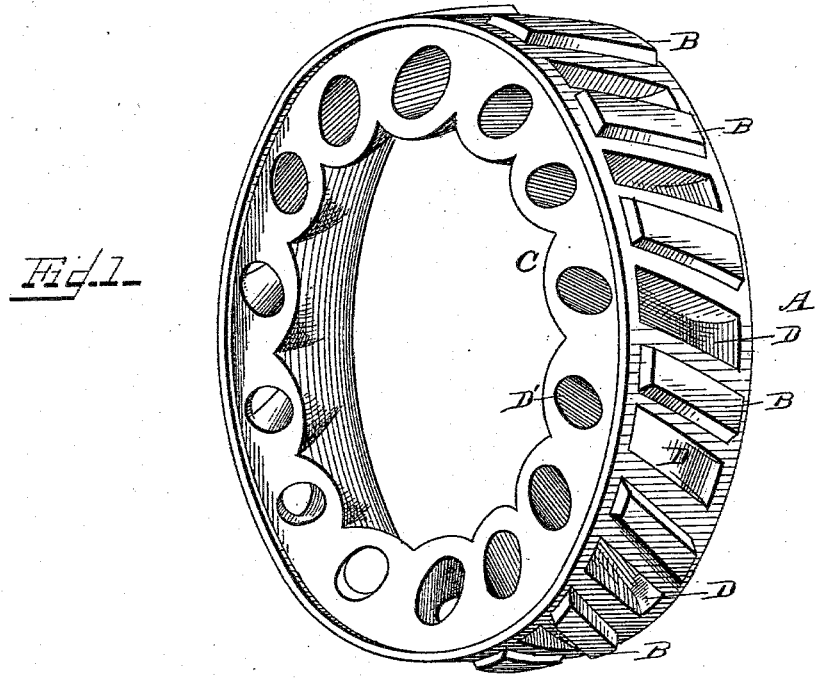
Fig. 1.
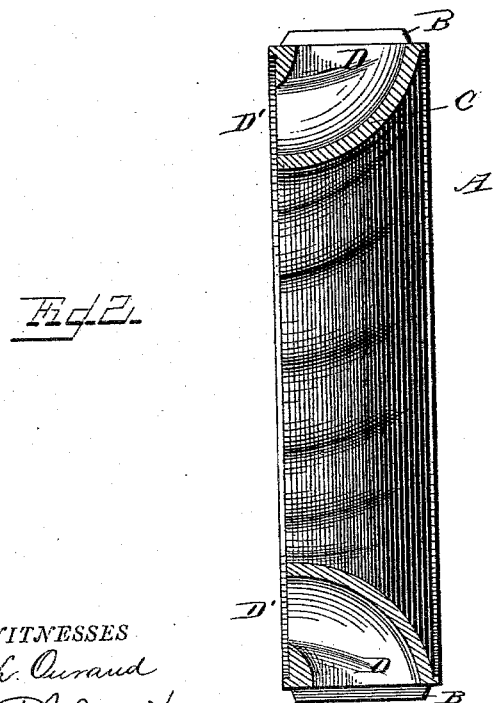
Fig. 2.
WITNESSES
F. L. Ourand
E. M. Johnson
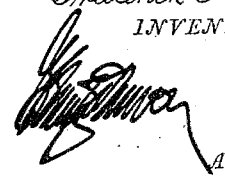
Isaac C. Michael
Frederick T. Michael
INVENTORS
Attorney

UNITED STATES PATENT OFFICE.

ISAAC C. MICHAEL AND FREDERICK T. MICHAEL, OF AVERY, INDIANA.

TRACTION-WHEEL.

SPECIFICATION forming part of Letters Patent No. 301,743, dated July 8, 1884.

Application filed May 8, 1884. (No model.)

*To all whom it may concern:*

Be it known that we, ISAAC C. MICHAEL and FREDERICK T. MICHAEL, citizens of the United States of America, residing at Avery, in the county of Clinton and State of Indiana, have invented certain new and useful Improvements in Traction-Wheels; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in traction-wheels for engines, harvesters, vehicles, &c., its object being to provide a tire or rim for the wheels of such devices which will prevent the rim of the same from becoming clogged with earth; and to this end our invention consists in providing a wheel with apertures which extend from the periphery of the rim to one side of the same, as will be hereinafter set forth.

In the accompanying drawings, Figure 1 is a perspective view, and Fig. 2 is a vertical section.

A represents the rim or tire of a traction-wheel, which is provided intermediately upon its periphery with projections B, which extend nearly across and above the plane of the rim, diagonally or otherwise. The inner portion of the rim is enlarged, as shown at C, and to said inner portion may be applied a circular rack-bar, supporting means, and hub, or other accessories for rotating the wheel and supporting the machine. The rim is provided between each of the projecting portions B with openings or apertures D, which are rectangular at the face of the rim, and converge, so as to terminate in elliptic or circular openings D' upon one side of the rim.

By providing a wheel with openings, as hereinbefore described, when the same rolls over soft ground, which would clog or fill the spaces between the projections B, so as to render the periphery of the wheel smooth, and thus lessen its adhesive power, the earth, instead of remaining upon the periphery of the wheel, is forced into the openings D and out through the openings D' upon the side of the wheel or rim.

By the means hereinbefore described we provide a rim for a wheel which is self-cleaning, and which will alway present a roughened face to the ground.

We claim—

1. The improved rim for wheels herein described, provided with openings which extend from the periphery of said rim to one side thereof, substantially as shown.

2. The improved rim for wheels, provided with projections B B and openings located intermediately between said projections, and terminating near one side of the rim, substantially as shown.

3. The improved rim for traction-wheels, having projections B B formed upon its face and an enlarged inner portion upon one side of the rim, and openings D, located between the raised portions B, and terminating within the outer rim of the wheel and to one side of the same, substantially as shown, and for the purpose set forth.

In testimony whereof we affix our signatures in presence of two witnesses.

ISAAC C. MICHAEL.
FREDERICK T. MICHAEL.

Witnesses:
ISAAC MOORHEAD,
OLIVE PALMER.